United States Patent
Park et al.

(10) Patent No.: US 7,136,040 B1
(45) Date of Patent: Nov. 14, 2006

(54) LIQUID CRYSTAL DISPLAY AND A METHOD FOR DRIVING THE SAME

(75) Inventors: Woon-Yong Park, Kyungki-do (KR); Haeng-Won Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/512,267

(22) Filed: Feb. 24, 2000

(30) Foreign Application Priority Data

Feb. 24, 1999 (KR) ........................... 99-6086

(51) Int. Cl.
*G09G 3/36* (2006.01)
(52) U.S. Cl. .......................... 345/100; 345/103
(58) Field of Classification Search .......... 345/96–103, 345/213, 215, 243; 340/784
See application file for complete search history.

(56) References Cited

U.S. PATENT DOCUMENTS

| | | | | |
|---|---|---|---|---|
| 5,093,655 A | * | 3/1992 | Tanioka et al. | 340/784 |
| 5,907,314 A | * | 5/1999 | Negishi et al. | 345/103 |
| 6,229,516 B1 | * | 5/2001 | Kim et al. | 345/103 |
| 6,421,039 B1 | * | 7/2002 | Moon et al. | 345/100 |

FOREIGN PATENT DOCUMENTS

JP 03-125187 A * 5/1991

* cited by examiner

*Primary Examiner*—Sumati Lefkowitz
*Assistant Examiner*—Srilakshmi K Kumar
(74) *Attorney, Agent, or Firm*—MacPherson Kwok Chen & Heid LLP; John F. O'Rourke

(57) ABSTRACT

Disclosed is a liquid crystal display (LCD). An LCD panel is divided into upper and lower panels, and a scanning direction of gate lines of the upper panel is opposite to that of gate lines of the lower panel. The upper panel includes an upper gate line block having a first gate line formed in the horizontal direction and transmits scanning signals, and upper data lines that cross the first gate line and transmit image signals. And the lower panel includes a lower gate line block having a second gate line, and lower data lines that cross the second gate line and are separated from the upper data lines. Upper and lower gate drivers that provide scanning signals to the gate lines of the upper and lower gate line blocks are located on the sides of the upper and lower panels, respectively. The upper and lower gate drivers supply the scanning signals to the gate lines in sequentially opposite directions. According to the present invention, the non-uniform brightness phenomenon can be prevented by making the scanning direction of the gate lines of the upper panel opposite to that of the gate lines of the lower panel.

20 Claims, 10 Drawing Sheets

LIQUID CRYSTAL DISPLAY AND A METHOD FOR DRIVING THE SAME

BACKGROUND OF THE INVENTION (a) Field of the Invention

The present invention relates to a liquid crystal display (LCD) and a method for driving the same. More specifically, the present invention relates to an LCD having its screen divided into two sections and driven individually, and a method for driving the same.

(b) Description of the Related Art

As personal computers and televisions become lighter in weight and thinner in profile, display devices must also become lighter in weight and thinner in profile. Accordingly, flat panel display devices such as LCDs are increasingly replacing the cathode ray tube (CRT).

In order to obtain desired image signals, the LCD applies an electric field to liquid crystal material having anisotropic dielectricity that is injected between two substrates, and controls the light amount permeating through the substrates by the intensity of the electric field. An LCD is one of the most commonly used portable flat panel display devices. In particular, a thin film transistor liquid crystal display (TFT-LCD), employing the TFT as a switching element, is widely used.

The LCD comprises a plurality of gate lines that transmit scanning signals. A plurality of data lines crossing the gate linestransmit image data. And a plurality of pixels formed by regions defined by the gate lines and data lines are interconnected through the gate lines, data lines and switching elements.

A method for applying the image data to each pixel in such an LCD will now be described.

When the scanning signals to turn on the gates (or gate-ON signals) are sequentially provided to the gate lines, the switching elements coupled to the gate lines are sequentially turned on. Image signals (i.e., data voltages) to be provided to pixel rows corresponding to the gate lines are concurrently provided to the respective data lines. The image signals provided to the data lines are then applied to the respective pixels through the switching elements that have been turned on. At this time, by sequentially applying the gate-ON signals to all the gate lines during one frame period such that the image signals are applied to all the pixel rows, one frame of image is displayed.

A recently developed higher-resolution LCD requires more gate lines. However, since the time for scanning a frame is limited to 1/60 of a second, the time interval of the gate-ON signal to be provided to the respective gate lines becomes shorter. Hence, it is difficult to provide sufficient image signals (i.e., the data voltages) to the image rows through the switching elements, which degrades the picture or image quality.

Therefore, a method has been disclosed recently to drive an LCD by dividing the display screen into two parts (an upper part and a lower part) in order to obtain a sufficient gate-ON time. Such a drive method is called a 'dual scan method'.

FIG. 1 shows an LCD adopting a dual scan method.

As shown in the drawing, the LCD using the dual scan method comprises a liquid crystal display (LCD) panel 10, an upper data driver 21, a lower data driver 22, an upper gate driver 31 and a lower gate driver 32.

The LCD panel 10 comprises a plurality of gate lines G1, G2, . . . , Gm, Gm+1, . . . , G2m to transmit the gate-ON signals and a plurality of data lines D1, D2, . . . , Dn, C1, C2, . . . , Cn to transmit the data voltages (i.e., image signals). Regions defined by the crossing of the data lines and gate lines form pixels. Each pixel comprises a TFT 12, a gate electrode of which is coupled to a gate line and a source electrode of which is coupled to a data line, a pixel electrode 14 coupled to a drain electrode of the TFT 12 and a common electrode (not illustrated) to which a common voltage is supplied. The plurality of gate lines are divided into an upper gate line block and a lower gate line block, each comprised of m gate lines, respectively G1, G2, . . . , Gm, and then, Gm+1, . . . , G2m. The data lines D1, D2, . . . , Dn coupled to the pixels corresponding to the gate lines G1, G2, . . . , Gm of the upper gate line block are separated from the data lines C1, C2, . . . , Cn coupled to the pixels corresponding to the gate lines Gm+1, . . . , G2m of the lower gate line block. For example, an upper pixel of a first column is coupled to the data line D1 and a lower pixel of the first column is coupled to the data line C1.

The upper and lower gate drivers 31 and 32, coupled respectively to the upper and lower gate line blocks, sequentially provide gate-ON voltages to the gate lines of the upper and lower gate line blocks, respectively. At this time, the gate-ON voltages are provided to the gate lines from the first gate line and to the last gate line. The upper and lower data drivers 21 and 22, located respectively in the upper part and lower part of the LCD panel, supply the data voltages to the upper data lines D1, D2, . . . , Dn and the lower data lines C1, C2, . . . , Cn, respectively.

The operation of the LCD will be described hereinafter.

The gate-ON signals are sequentially provided to the TFTs 12 from the gate lines of the upper and lower gate line blocks starting from the first gate line then to subsequent gate lines. Concurrently, the data voltages (i.e., image signals) are provided to the upper and lower data lines. The TFTs 12 are turned on by the gate-ON signals, and the data voltages supplied to the data lines are provided to pixel electrodes through the TFTs 12 that are turned on. Electric fields generated by differences between the pixel voltages (i.e., the voltages supplied to the pixel electrodes) and the common voltages of the common electrodes are applied to the liquid crystal material. Since the arrangement of the liquid crystal material changes depending upon the intensity of the electric field (the intensity of the electric field varies according to the intensity of the data voltage), the amount of light permeating the liquid crystal material varies. Therefore, desired images are displayed on the LCD.

Since the gate-ON signals are concurrently supplied to the gate lines in the upper and lower gate line blocks, the above described dual scan type LCD has the advantage of a twice longer gate-ON time than the conventional single scan LCDs.

The electric field applied to the liquid crystal material continuously in the same direction deteriorates the liquid crystal material. Accordingly, when the data voltages are driven, the polarities of the data voltages are alternated between positive and negative values. Such a drive method is referred to as an inversion drive method.

Among different types of inversion drive methods are a frame inversion drive method that alternates the polarities every frame; a line inversion drive method that alternates the polarities every line; and a dot inversion drive method that alternates the polarities every pixel. The line inversion and dot inversion drive methods are most commonly used. However, the line inversion drive method or dot inversion drive method, when applied to the conventional dual scan type LCD, causes various drawbacks as described below.

It is assumed that the pixel of the LCD in FIG. 1 are driven by the dot inversion drive method, as shown by the positive (+) and negative (−) indications. The positive (+) polarity indicates that the polarity of the pixel voltage with respect to the common voltage is positive, and the negative (−) polarity indicates that the polarity of the pixel voltage with respect to the common voltage is negative.

A waveform of a voltage applied to the pixel electrode electrically coupled to the gate line Gm of the upper gate line block and to the data line D1, and a waveform of a voltage applied to the pixel electrode electrically coupled to the gate line Gm+1 of the lower gate line block and to the data line C1 are shown in FIG. 2.

As shown in FIG. 2 (a), in an ideal state, a voltage Vpu lower than the common voltage Vcom is uniformly applied during a period of one frame to the pixel electrode of the first pixel row coupled to the last gate line Gm in the upper gate line block. However, in the actual LCD, since a parasitic capacitance is generated between the pixel electrode and data line, the pixel voltage provided to the actual pixel electrode is affected by the voltage provided to the data line. That is, since the data voltages Vd1, the polarities of which with respect to the common voltage Vcom are periodically alternated are provided to the first data line D1 as shown in FIG. 2 (a), the actual voltage Va provided to the pixel electrode becomes the waveform as shown in FIG. 2 (b). For ease of explanation, the data voltages are assumed to be symmetrical with respect to the common voltage Vcom.

In more detail, as illustrated in FIGS. 2 (a) and (b), in the case where a pixel voltage Vpu with a negative polarity is provided and then a data voltage Vd with a positive polarity is provided to the data lines, the actual pixel voltage Va, unlike the ideal pixel voltage Vpu, is pulled in the direction of the common voltage by as much as ΔV due to the parasitic capacitance. On the other hand, if a data voltage with a negative polarity is provided to the data lines, the actual pixel voltage Va is pulled in the opposite direction of the common voltage by as much as ΔV.

As shown in FIG. 2 (c), in the ideal case, a constant voltage Vpd, higher than the common voltage Vcom, is provided to a pixel electrode of a first pixel row coupled to the first gate line Gm+1 in the lower gate line block during one frame interval. Further, a data voltage with a polarity identical to that of the data voltage provided to the data line D1 is supplied to a first data line C1. This is because the scanning process begins from the first gate line of each of the upper gate line block and the lower gate line block and the polarities of the pixel voltages coupled to the first gate line in the upper gate line block and lower gate line block are identical.

Therefore, because of the influence of the parasitic capacitance, the actual voltage provided to the pixel electrode has a waveform as shown in FIG. 2 (d). That is, as shown in FIGS. 2 (c) and (d), when the voltage Vpd with a positive polarity is provided and then the data voltage with a positive polarity is provided to the data lines, the actual pixel voltage Vb, unlike the ideal pixel voltage Vpd, is pulled in the opposite direction of the common voltage by as much as ΔV due to the parasitic capacitance. Also, if a data voltage with a negative polarity is provided to the data lines, the actual pixel voltage Vb is pulled in the direction of the common voltage by as much as ΔV.

As a result, since the voltages provided to the data lines influence the pixels of the two pixel rows on the boundaries in the opposite directions, the actual difference between the voltage provided to the pixels and the common voltage becomes the area marked by oblique lines in FIGS. 2 (b) and (d). This makes a bigdifference in the amounts of the light permeating the liquid crystal material in the pixels at the boundaries of the upper block and the lower block, which results in the inconsistent brightness on the boundaries. Eventually, this appears as undesired lines at the boundaries between the upper block and the lower block.

SUMMARY OF THE INVENTION

It is an object of the present invention to provide a liquid crystal display (LCD) and a method for driving the same by dividing the screen into two panels and eliminates non-uniform luminance phenomena at the boundaries of the two panels.

In order to achieve this object, the LCD panel is divided into two panels—an upper panel and a lower panel. When providing scanning signals to gate lines, the scanning direction for the upper panel is opposite to that for the lower panel to prevent the non-uniformity of the luminance at the boundaries of the panels.

According to the present invention, a liquid crystal display (LCD) comprises a first gate line block including a plurality of first gate lines transmitting scanning signals, a second gate line block including a plurality of second gate lines transmitting scanning signals, scanning directions of the first gate lines being opposite to scanning directions of the second gate lines, a plurality of first data lines transmitting image signals and crossing the first gate lines of the first gate line block, a plurality of second data lines separated from the first data lines and crossing the second gate lines of the second gate line block, a plurality of pixels configured in a matrix pattern and defined by the gate lines and data lines, and including switching elements coupled to the gate lines and the data lines.

The number of the first gate lines is equal to the number of the second gate lines. The first gate lines and the second gate lines are simultaneously scanned.

According to the other aspect of the present invention, a liquid crystal display (LCD) comprises an LCD panel that includes a first gate line block having a plurality of first gate lines, a second gate line block formed beneath the first gate line block and having a plurality of second gate lines, a plurality of first data lines crossing and separated from the first gate lines of the first gate line block, a plurality of second data lines crossing and separated from the second gate lines of the second gate line block, and a plurality of pixels formed by areas defined by the gate lines and data lines, and arrayed in a matrix pattern, the pixels having switching elements coupled to the gate lines and the data lines, and common electrodes to which common voltage is supplied. The LCD further comprises a first data driver supplying data voltages, which contain image signals, to the first data lines, a second data driver supplying data voltages, which contain image signals, to the second data lines, a first gate driver supplying scanning signals to the gate lines of the first gate line block, a second gate driver supplying scanning signals to the gate lines of the second gate line block in an opposite scanning direction as the first gate driver, a first frame memory receiving and writing external image signals in synchronization with write clock signals, and outputting the image signals to the first data driver in synchronization with read clock signals, and a second frame memory receiving and writing external image signals in synchronization with the write clock signals, and outputting the image signals to the second data driver in synchronization with the read clock signals.

The number of the first gate lines is equal to the number of the second gate lines. The first gate driver and the second gate driver are simultaneously scanned. Polarities of the data voltages supplied to the pixels coupled to adjacent gate lines of the first gate line block are opposite to each other with respect to the common voltage, and the polarities of the data voltages supplied to the pixels coupled to the neighboring gate lines of the second gate line block are opposite to each other with respect to the common voltage. The first gate driver sequentially supplies the scanning signals to the gate lines in the direction from the last gate line of the first gate line block to the first gate line, and the second gate driver sequentially supplies the scanning signals to the gate lines in the direction from the first gate line of the second gate line block to the last gate line. The first frame memory outputs the image signals, which are written in a reverse order from the image signals to be provided to the first data lines, to the first data driver, and the second frame memory outputs the image signals, which are written in the same order from the image signals to be provided to the second data lines, to the second data driver. The polarity of the common voltage, with respect to the data voltage supplied to the pixels coupled to the last gate line of the first gate line block, is opposite to that of the common voltage, with respect to the data voltage supplied to the pixels coupled to the first gate line of the second gate line block on the identical pixel row. The polarity of the common voltage, with respect to the data voltage supplied to the pixels coupled to the last gate line of the first gate line block, is identical to that of the common voltage, with respect to the data voltage supplied to the pixels coupled to the first gate line of the second gate line block on the identical pixel row. The first gate driver sequentially supplies the scanning signals to the gate lines in the direction from the first gate line of the first gate line block to the last gate line, and the second gate driver sequentially supplies the scanning signals to the gate lines in the direction from the last gate line of the second gate line block to the first gate line. The first frame memory outputs the image signals, which are written in an order identical to the image signals to be provided to the first data lines, to the first data driver, and the second frame memory outputs the image signals, which are written in an order opposite to the image signals to be provided to the second data lines, to the second data driver. The polarity of the common voltage, with respect to the data voltage supplied to the pixels coupled to the last gate line of the first gate line block, is opposite to that of the common voltage, with respect to the data voltage supplied to the pixels coupled to the first gate line of the second gate line block on the identical pixel row. The polarity of the common voltage with respect to the data voltage supplied to the pixels coupled to the last gate line of the first gate line block, is identical to that of the common voltage, with respect to the data voltage supplied to the pixels coupled to the first gate line of the second gate line block on the identical pixel row.

In another aspect of the present invention, a method for driving a liquid crystal display (LCD) including a first gate line block having a plurality of first gate lines formed in a horizontal direction, a second gate line block formed beneath the first gate line block and having a plurality of second gate lines, a plurality of first data lines crossing and separated from the first gate lines of the first gate line block, and a plurality of second data lines crossing and separated from the second gate lines of the second gate line block, comprises the steps of providing sequentially scanning signals to the first gate line of the first gate line block, providing sequentially scanning signals to the second gate line of the second gate line block in an opposite scanning direction to the first gate line, and supplying data voltages, which contain image signals, to the first and second data lines so that the data voltages are supplied to the pixels coupled to the gate lines to which the scanning signals are provided.

The scanning signals are sequentially provided to the first gate line block in the direction from the last gate line to the first gate line and to the second gate line block in the direction from the first gate line to the last gate line. The method further comprises the steps of writing the externally received image signals to be provided to the first data line to the first frame memory, writing the externally received image signals to be provided to the second data line to the second frame memory, outputting the image signals to the first data lines in an opposite order as the image signals to be written to the first frame memory and outputting the image signals to the second data lines in an order opposite to the image signals to be written to the second frame memory. The scanning signals are sequentially provided to the first gate line block in the direction from the first gate line to the last gate line, and to the second gate line block in the direction from the last gate line to the first gate line. The method further comprises the steps of writing the externally received image signals to be provided to the first data line to the first frame memory, writing the externally received image signals to be provided to the second data line to the second frame memory, outputting the image signals to the first data lines in an opposite order as the image signals to be written to the first frame memory, and outputting the image signals to the second data lines in an order opposite to the image signals to be written to the second frame memory.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustrating the best mode contemplated by inventors of carrying out the invention. As will be realized, the invention is capable of modification in various obvious respects, all without departing from the invention. Accordingly, the drawings and description are to be regarded as illustrative in nature, and not restrictive.

Figure 1:
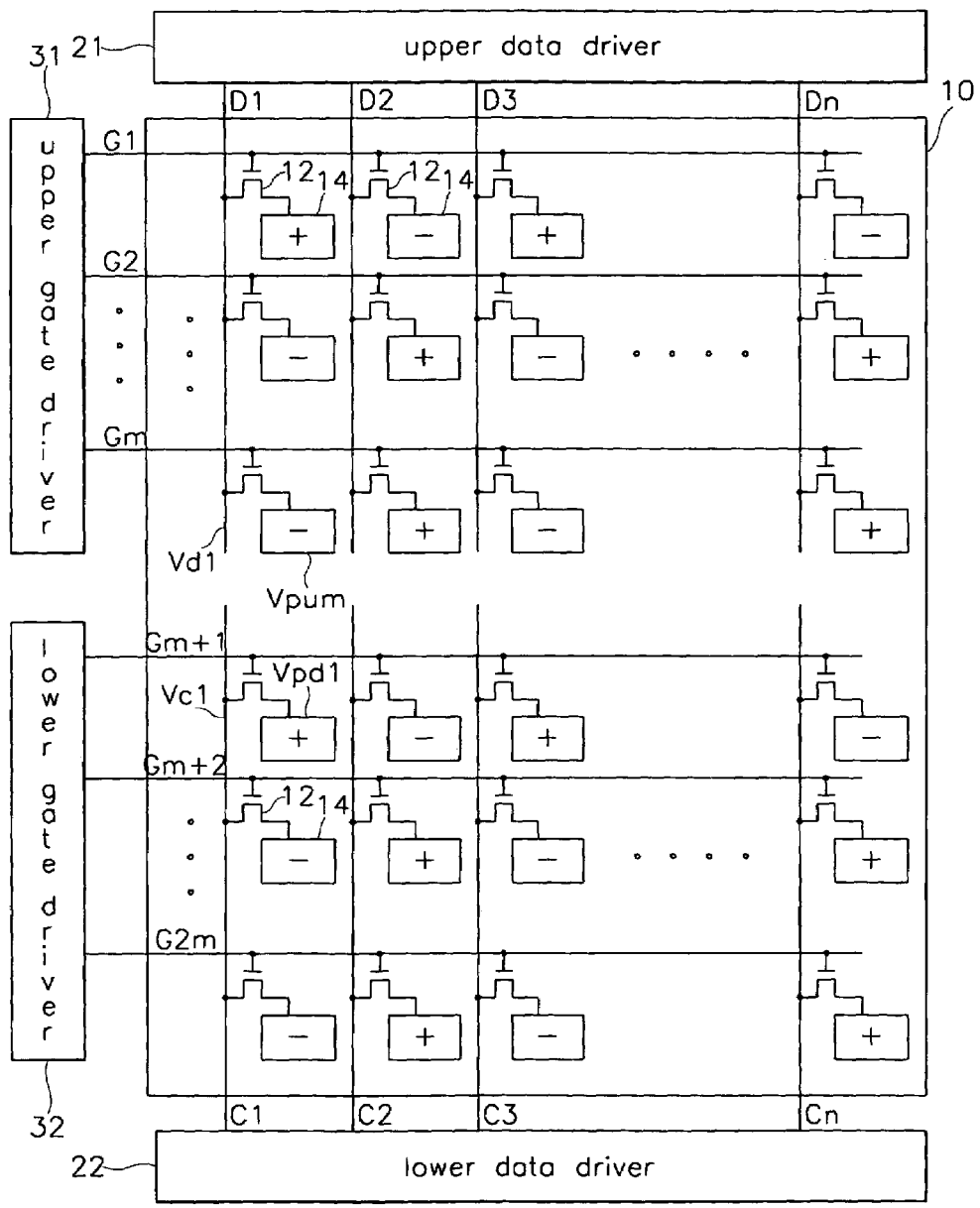
FIG. 1 is an LCD configured for a dual scan method.
Figure 2:
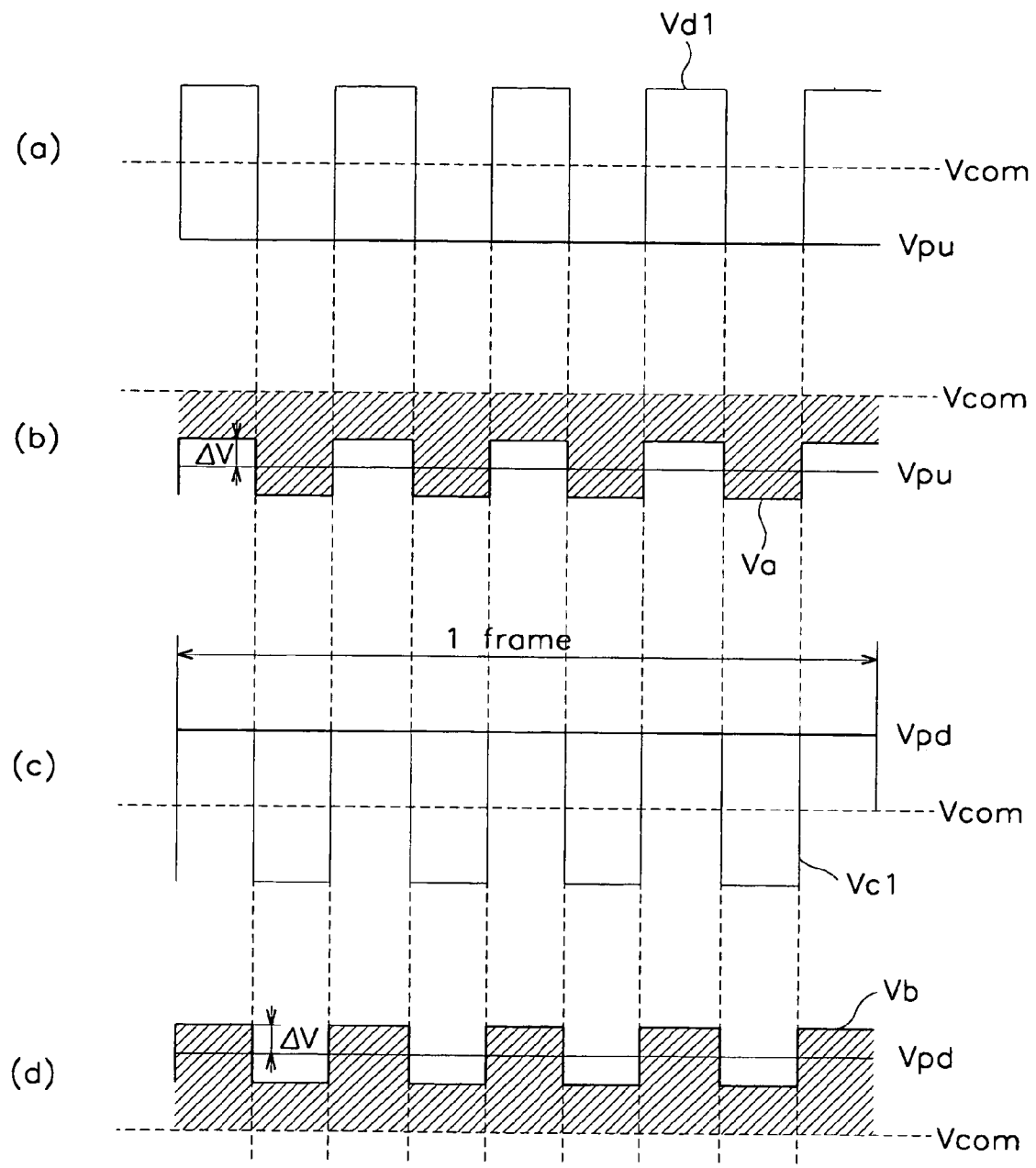
FIGS. 2 (a), (b), (c), and (d) are waveforms according to a conventional LCD driving method.
Figure 3:
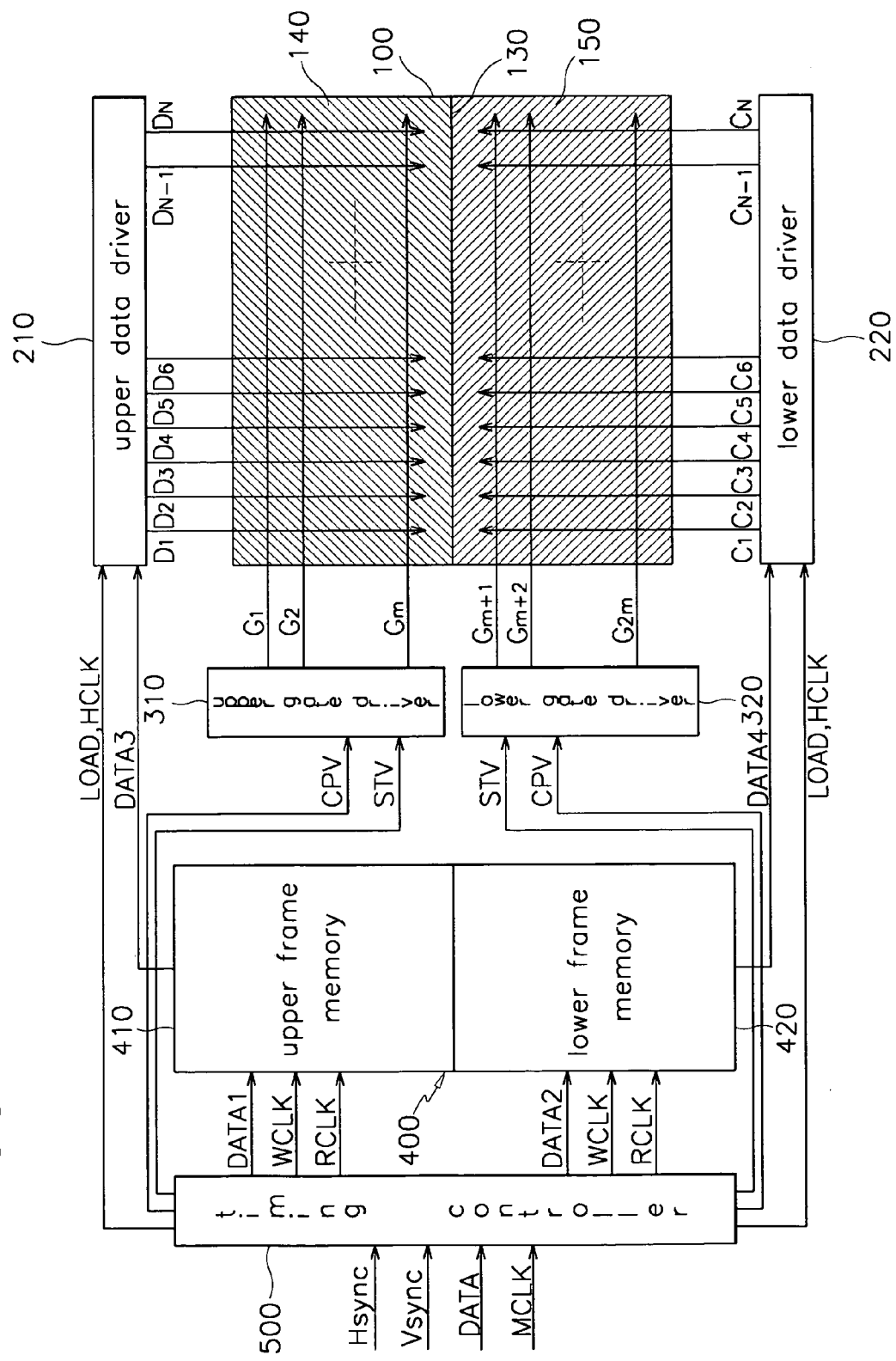
FIG. 3 is a schematic diagram of an LCD according to a preferred embodiment of the present invention.

FIG. 3 shows an LCD according to a preferred embodiment of the present invention.

The LCD comprises an LCD panel 100, an upper data driver 210, a lower data driver 220, an upper gate driver 310, a lower gate driver 320, a frame memory unit 400 including an upper frame memory 410 and a lower frame memory 420, and a timing controller 500.

Figure 5:
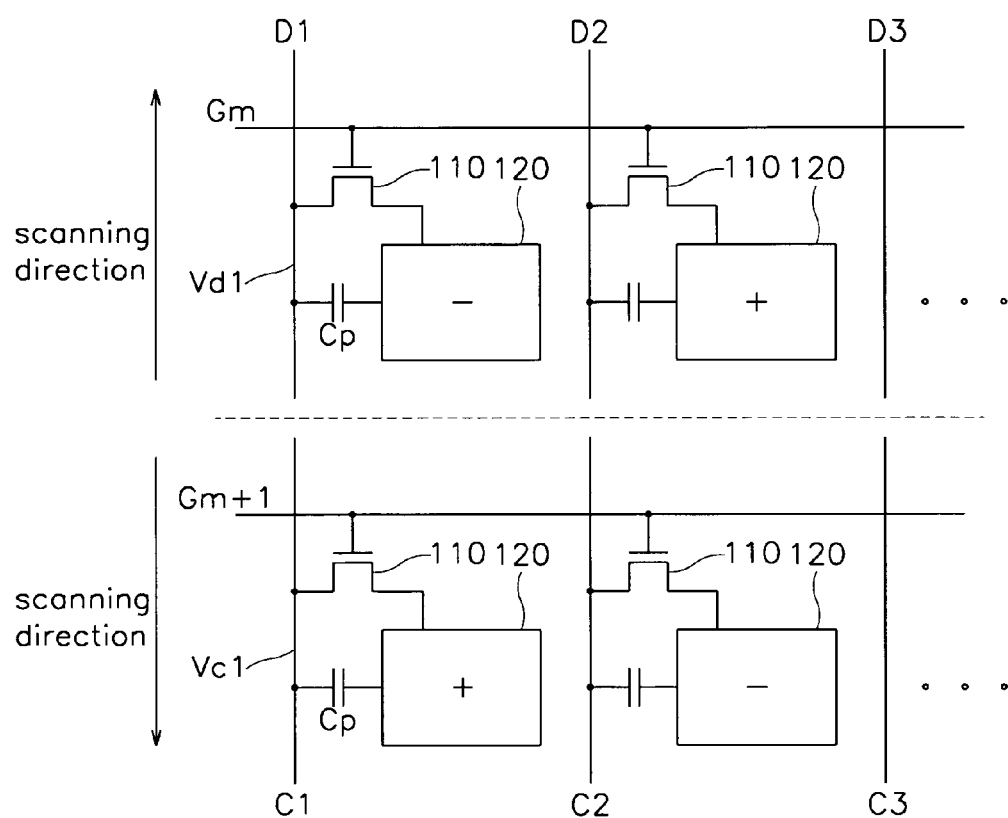
FIG. 5 is a circuit diagram illustrating polarities and scanning directions of the LCD shown in FIG. 3 according to a first embodiment of the present invention.

The LCD panel 100 comprises 2m gate lines G1, G2, ..., Gm+1, ..., G2m to transmit gate-ON signals, and data lines D1, D2, ..., Dn and C1, C2, ..., Cn to transmit the data voltages displaying image signals. Areas defined by the gate lines and data lines form pixels, and each pixel comprises, as shown in FIG. 5, a TFT 110, a gate line that is coupled to a gate electrode and a data line that is coupled to a source electrode, a pixel electrode 120 coupled to a drain electrode of the TFT 110, and a common electrode (not illustrated) to which a common voltage is supplied. The 2m gate lines are divided into an upper gate line block comprising m gate lines of G1, G2, ..., Gm and a lower gate line block comprising m gate lines of Gm+1, Gm+2, ..., G2m. The upper data lines D1, D2, ..., Dn coupled to pixels corresponding to the gate lines G1, G2, ..., Gm of the upper gate line block are separated from the lower data lines C1, C2, ..., Cn coupled to the pixels corresponding to the gate lines Gm+1, Gm+2, ..., G2m of the lower gate line block. That is, the LCD panel according to the embodiment of the present invention comprises an upper panel 140 and a lower panel 150. The upper panel 140 comprises the upper gate line block and upper data lines D1, D2, ..., Dn, and the lower panel 150 comprises the lower gate line block and the lower data lines C1, C2, ..., Cn.

The upper and lower gate drivers 310 and 320, each coupled to the upper and lower gate line blocks, sequentially supply gate-ON voltages to the gate lines of the gate line blocks in the opposite scanning directions. For example, when the upper gate driver 310 drives gate-ON voltages in the direction from the first gate line G1 of the upper gate line block to the $m^{th}$ gate line Gm (i.e., from the top to the bottom), the lower gate driver 320 drives the gate-ON voltages in the direction from the last gate line G2m of the lower gate line block to the first gate line Gm+1 (i.e., from the bottom to the top). As mentioned above, when the upper gate driver 310 sequentially supplies the gate-ON voltages to the gate lines in the direction from the bottom to the top, the lower gate driver 320 supplies the gate-ON voltages to the gate lines in the direction from the top to the bottom.

The upper data driver 210 and the lower data driver 220, located on the upper side and lower side of the LCD panel are coupled to the upper frame memory 410 and the lower frame memory 420. They respectively supply the data voltages displaying the image signals to the upper data lines D1, D2, ..., Dn and the lower data lines C1, C2, ..., Cn.

The timing controller 500 receives image data signals DATA, main clocks MCLK, horizontal synchronization signals Hsync, and vertical synchronization signals Vsync, and provides timing signals to the frame memory unit 400, upper gate driver 310, lower gate driver 320, upper data driver 210, and lower data driver 220. The upper frame memory 410 and the lower frame memory 420, synchronized with write clock signals WCLK and read clock signals RCLK (the frequency of which is half the write clock signals WCLK provided from the timing controller 500), write and read the image data signals to be provided to the upper data driver 210 and the lower data driver 220.

Figure 4A:
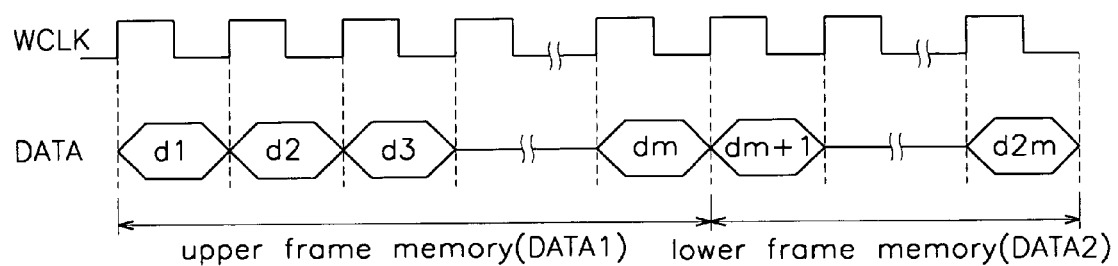
FIGS. 4 (a) and (b) are timing diagrams of data input and output to and from a frame synchronized with writing and reading clock signals.
Figure 4B:
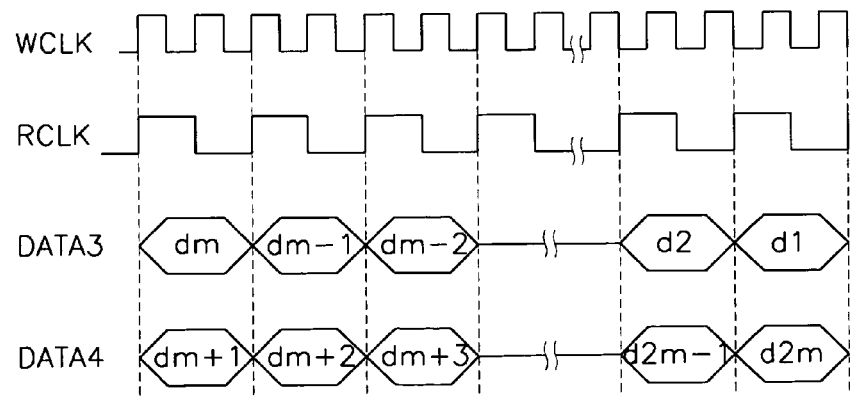

The operation of the LCD according to the first embodiment of the present invention will be described hereinafter. FIGS. 4 (a) and (b) are data timing diagrams illustrating that the data synchronized with the write clock signals WCLK and read clock signals RCLK (RCLK=WCLK/2) are input and output to and from the frame memories.

The external image data signals DATA, main clocks MCLK, vertical synchronization signals Vsync (i.e., frame synchronization signals), and horizontal synchronization signals Hsync (i.e., synchronization signals of the horizontal lines or the scanning lines) are provided to the timing controller 500.

Referring to FIG. 4 (a), the frame memories are synchronized with the write clock signals WCLK provided from the timing controller 500 and write data. That is, data synchronized with the write clock signals WCLK are written to the upper frame memory 410 in order starting from the image data d1 to be provided to the first pixel row. In this case, the image data d1, d2, ..., dm to be provided to the pixel rows from the first pixel row to the $m^{th}$ pixel row (i.e., the pixel rows corresponding to the gate lines of the upper gate line block) are written on the upper frame memory 410. On the other hand, the image data, synchronized with the write clock signals WCLK, starting from the image data dm+1, to be provided to the pixel row corresponding to the first gate line Gm+1 of the lower gate line block, to all subsequent image data dm+1, dm+2, ..., d2m are sequentially written on the lower frame memory 420.

When all the image data to be provided to each pixel row are written on the upper frame memory 410 and the lower frame memory 420, the image data synchronized with the read clock signals RCLK are transmitted to the upper data driver 210 or lower data driver 220 as shown in FIG. 4 (b). At this time, according to the first embodiment of the present invention, the image data for the upper data driver 210 are transmitted to the upper data driver 210 in an order opposite to that in which the upper frame memory 410 is written (i.e., dm, dm−1, dm−2, ..., d2, d1). The image data for the lower data driver 220 are transmitted to the lower data driver 220 in an order identical to that in which the lower frame memory 420 is written. Therefore, according to the present invention, frame memories that can be addressed in a reverse order of writing should be used.

When the image data synchronized with the clock signal HCLK are transmitted to the upper data driver 210 and the lower data driver 220, the image data are transformed into corresponding data voltages and provided to each line of the upper data lines D1, D2, ..., Dn and lower data lines C1, C2, ..., Cn according to load signals LOAD output from the timing controller 500.

The upper gate driver 310 and the lower gate driver 320 supply gate-ON signals (i.e., scanning signals), synchronized with start signals STV and gate clocks CPV output from the timing controller 500, to the gate lines of the upper gate line block and concurrently to the gate lines of the lower gate line block. At this time, according to the first embodiment of the present invention, the upper gate driver 310 sequentially provides the gate-ON voltages from the last gate line Gm of the upper gate line block to the first sgate line G1 of the upper gate line block (i.e., from the bottom to the top). And the lower gate driver 320 sequentially provides the gate-ON voltages to the frist gate line GM+1 of the lower gate line block the last gate line G2m of the lower gate line block (i.e., from the top to the bottom).

The TFTs coupled to the gate lines to which the gate-ON voltages are provided are turned on, and therefore, the data voltages provided to the data lines are transmitted to the pixel electrodes through the TFTs that are turned on, displaying desired images.

The above-described embodiment of the present invention can eliminatelines appearing at the center of the screen when driving the dual-scan LCD using the dot inversion or line inversion methods.

Figure 6:
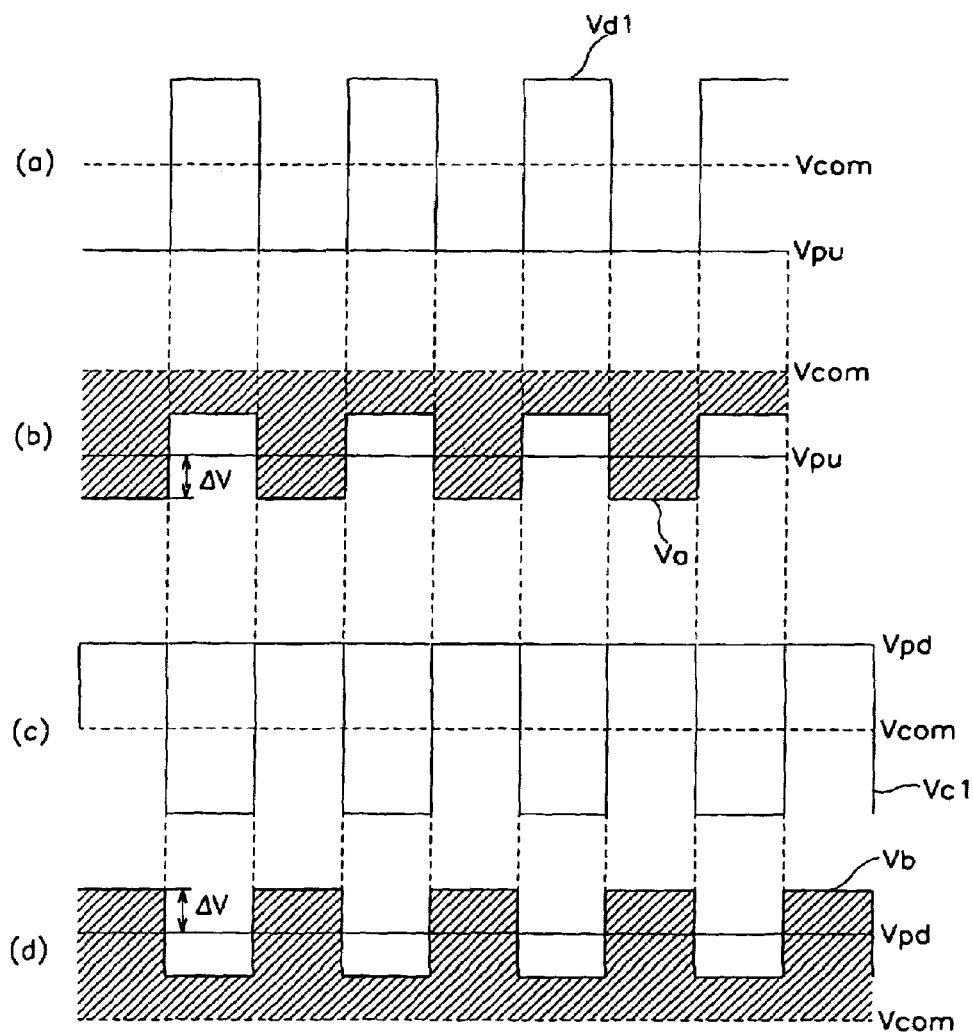
FIGS. 6 (a), (b), (c), and (d) are signal waveforms according to the first embodiment of the present invention.

FIG. 5 is a circuit diagram illustrating polarities and scanning directions of the upper gate driver 310 and the lower gate driver 320 according to the first embodiment of the present invention. FIGS. 6 (a), (b), (c) and (d) are signal waveforms according to the first embodiment of the present invention.

Referring to FIG. 5, (+) indicates that the polarity of a pixel voltage against the common voltage is positive, and (−) indicates that the polarity of a pixel voltage against the common voltage is negative. Two adjacent pixels in the first pixel row will be described as an example hereinafter.

Referring to FIG. 6 (a), in an ideal case, a voltage Vpu lower than the common voltage Vcom applied to a pixel electrode of the first pixel row coupled to the last gate line Gm of the upper gate line block should remain uniform and constant during one frame. However, the parasitic capacitance between the pixel electrode and the data line has the actual pixel voltage provided to the pixel electrode affected as a voltage for another pixel connected to the same data line is applied. That is, since the data voltages, the polarities of which are periodically alternated with reference to the common voltage, are provided to the first upper data line D1, the actual voltage Va provided to the pixel electrode is as shown in FIG. 6 (b). At this time, since the gate line is scanned from the bottom to the top and the polarity of the pixel electrode corresponding to the last gate line Gm of the first pixel row is negative, the data voltages provided to the data line D1 alternate continuously between positive and negative as shown in FIG. 6 (a).

In more detail, referring to FIGS. 6 (a) and (b), when the pixel voltage Vpu with a negative (−) polarity is supplied, and the data voltage with a negative (−) polarity is supplied to the data line, the actual pixel voltage Va is, due to the influence of parasitic capacitance Cp, drawn to the opposite direction of the common voltage by as much as ΔV, compared to the ideal pixel voltage Vpu. On the other hand, when the data voltage of a positive (+) polarity is supplied to the data line, the actual pixel voltage Va is drawn to the direction of the common voltage by as much as ΔV.

Referring to FIG. 6 (c), in an ideal case, a voltage Vpd higher than the common voltage Vcom is uniformly supplied to the pixel electrode of the first pixel row coupled to the first gate line Gm+1 of the lower gate line block and it should remain uniform and constant during one frame period. Another data voltage with a polarity different from the data voltage supplied to the data line D1 is supplied to the first lower data line C1, because, as shown by FIG. 5, the upper gate line block is scanned from bottom to top, the lower gate line block is scanned from top to bottom, and the pixel voltage Vpu coupled to the last gate line Gm of the upper gate line block is different from the first gate line Gm+1 of the lower gate line block. Hence, the actual voltage supplied to the pixel electrode due to parasitic capacitance Cp has waveforms as shown in FIG. 6 (d). That is, referring to FIGS. 6 (c) and (d), when the pixel voltage Vpd with a positive (+) polarity is supplied, and the data voltage with a positive (+) polarity is supplied to the data line, the actual pixel voltage Vb is, due to the influence of parasitic capacitance Cp, drawn to the opposite direction of the common voltage by as much as ΔV compared to the ideal pixel voltage Vpd. When the data voltage of a negative (−) polarity is supplied to the data line, the actual pixel voltage Vb is drawn to the direction of the common voltage by as much as ΔV.

As described above, according to the first embodiment of the present invention, since the voltages provided to the data lines influence the pixels of the two pixel rows on the boundaries in the identical direction, the difference between the voltage supplied to the actual pixels and the common voltage is as shown by the oblique lines in FIGS. 6 (b) and (d). Therefore, since a difference in the amount of light permeating the liquid crystal material on the pixels of the boundaries is small, the brightness on the boundaries becomes almost uniform. Consequently, the line patterns appearing on the boundaries of the upper and lower panels in the conventional method of driving the dual scan LCD disapears.

An operation of the LCD according to a second embodiment of the present invention will now be described.

Figure 7:
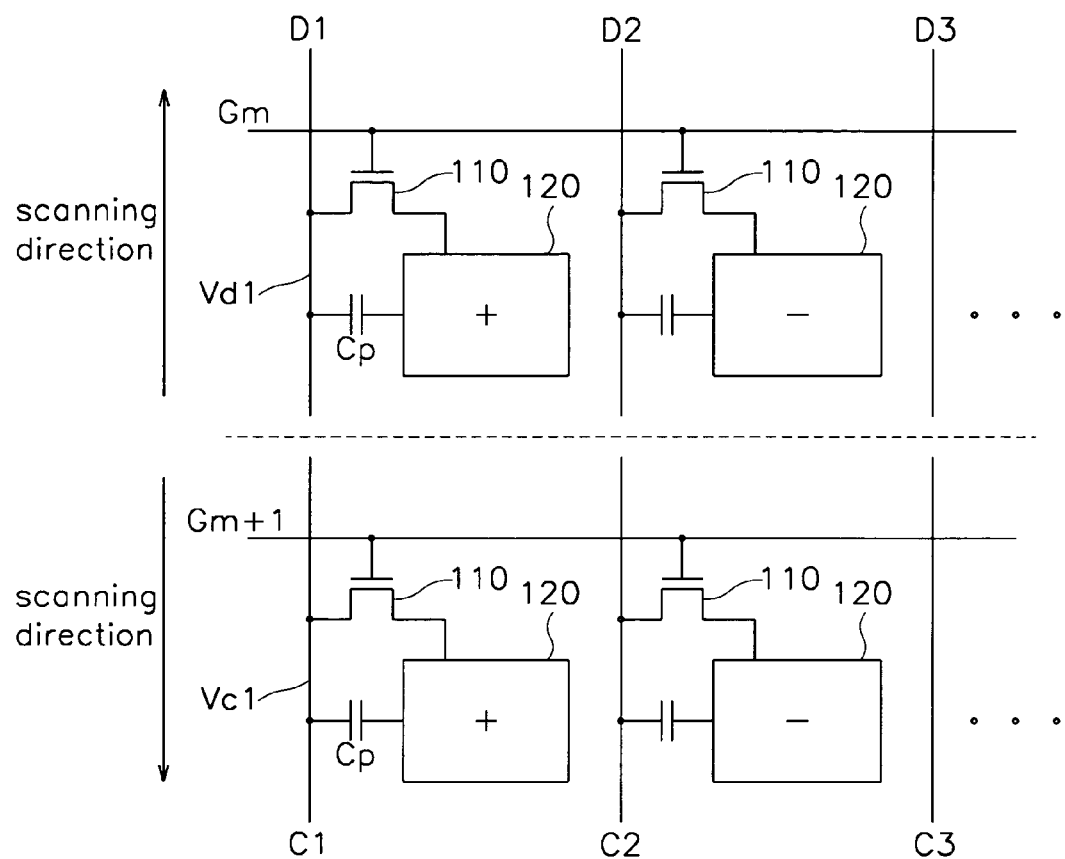
FIG. 7 is a circuit diagram illustrating polarities and scanning directions of the LCD shown in FIG. 3 according to a second embodiment of the present invention.
Figure 8:
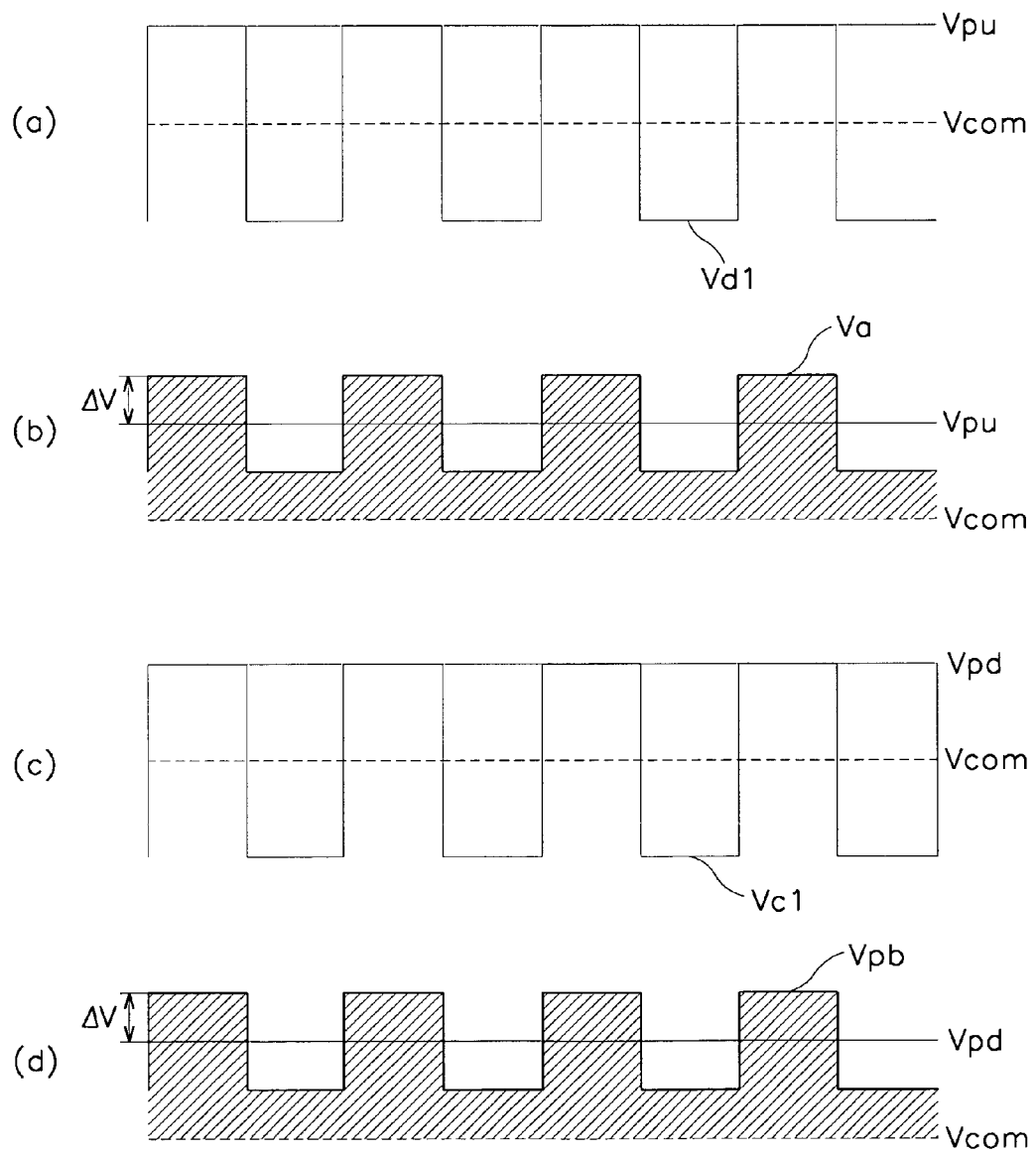
FIGS. 8 (a), (b), (c), and (d) are signal waveforms according to the second embodiment of the present invention.

FIG. 7 is a circuit diagram illustrating polarities and scanning directions of the upper and lower gate drivers of the LCD according to the second embodiment of the present invention. FIG. 8 shows various signal waveforms according to the second embodiment of the present invention.

Referring to FIG. 7, the polarities of two adjacent pixels on the boundaries are identical to each other, and the polarities of other pixels on the boundaries are alternated. Two adjacent pixels on the first pixel row will be described as an example hereinafter.

Referring to FIG. 8 (a), in an ideal case, a pixel voltage Vpu higher than the common voltage Vcom is uniformly supplied to the pixel electrode of the first pixel row coupled to the last gate line Gm of the upper gate line block and maintained uniform and constant during one frame period. However, the actual pixel voltage of the pixel electrode is influenced by the voltage subsequently supplied to the data line due to the parasitic capacitance Cp between the pixel electrode and the data line.

That is, since the data voltages, the polarity of which periodically alternates with respect to the common voltage, are supplied to the first upper data line D1, the voltage Va supplied to the actual pixel electrode becomes as shown in FIG. 8 (b). At this time, since the gate lines are scanned from bottom to top and the polarity of the pixel electrode corresponding to the last gate line Gm of the first pixel row is positive, the data voltages supplied to the data line D1 alternate between positive and negative as shown in FIG. 8 (a).

In more detail, as shown in FIGS. 8 (a) and (b), when the pixel voltage Vpu with a positive polarity is supplied and the data voltage with a positive polarity is supplied to the data line, the actual pixel voltage Va is drawn to the opposite direction of the common voltage by as much as ΔV, compared to the ideal pixel voltage Vpu as a result of parasitic capacitance. On the other hand, when the data voltage with a negative polarity is supplied to the data line, the pixel voltage Va is drawn to the direction of the common voltage by as much as ΔV.

Referring to FIG. 8 (c), in an ideal case, a pixel voltage Vpd higher than the common voltage Vcom is supplied to the pixel electrode of the first pixel row coupled to the first gate line Gm+1 of the lower gate line block and maintained uniform and constant during one frame period. The data voltage, which has an identical polarity with the data voltage supplied to the data line D1, is supplied to the first lower data line C1, because, as shown in FIG. 7, the upper gate line block is scanned from bottom to top, the lower gate line block is scanned from top to bottom, and the polarity of the pixel voltage coupled to the last gate line Gm of the upper gate line block is identical to the polarity of the pixel voltage coupled to the first gate line Gm+1 of the lower gate line block. Therefore, the voltage supplied to the actual pixel electrode has waveforms as shown in FIG. 8 (d).

Referring to FIG. 8, according to the second embodiment of the present invention, since the voltages provided to the data lines influence the pixels of the two pixel rows on the boundaries in the identical direction, the difference between the actual voltage of the pixels and the common voltage is as shown by the oblique lines in FIGS. 8 (b) and (d). Therefore, since the difference in the amount of light permeating the liquid crystal material on the pixels of the boundaries is small, the brightness on the boundaries becomes almost uniform. Consequently, the conventional line patterns generated at the boundaries of the upper panel and the lower panel do not appear.

In the above embodiment of the present invention, the gate line coupled to the upper gate driver is scanned from bottom to top, and the gate line coupled to the lower gate driver is scanned from top to bottom.

Figure 9A:
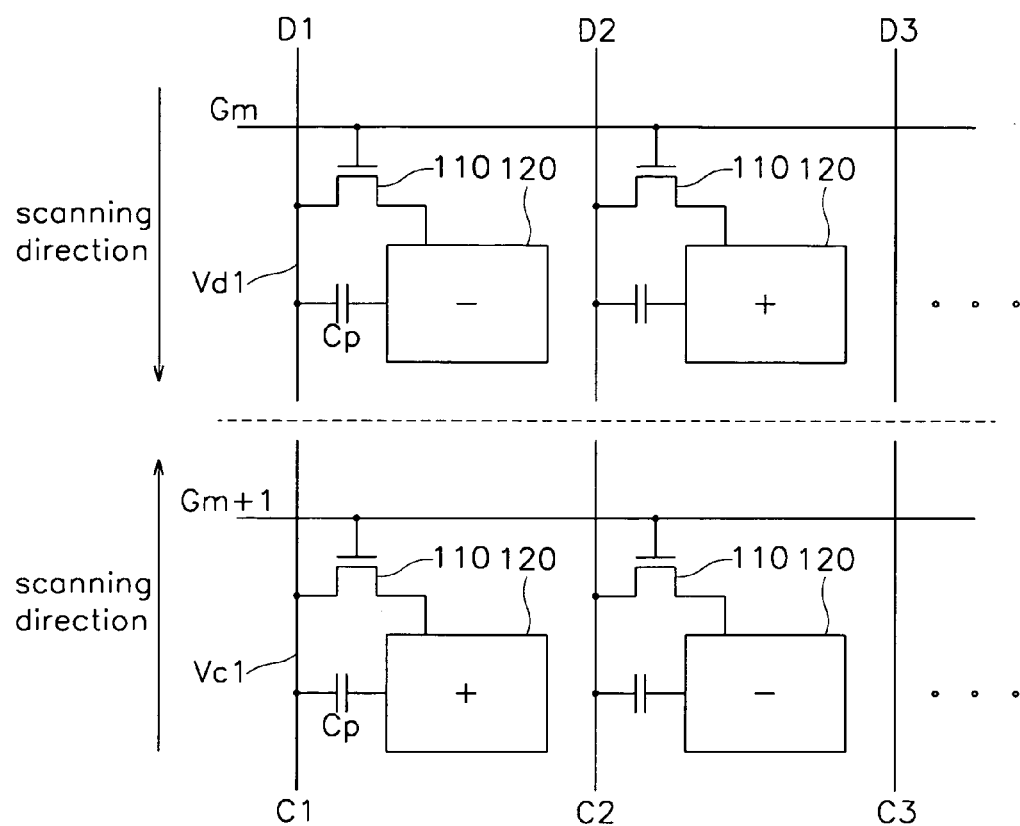
FIGS. 9 (a) and (b) are circuit diagrams illustrating polarities and scanning directions of the LCD shown in FIG. 3 respectively according to third and fourth embodiments of the present invention.
Figure 9B:
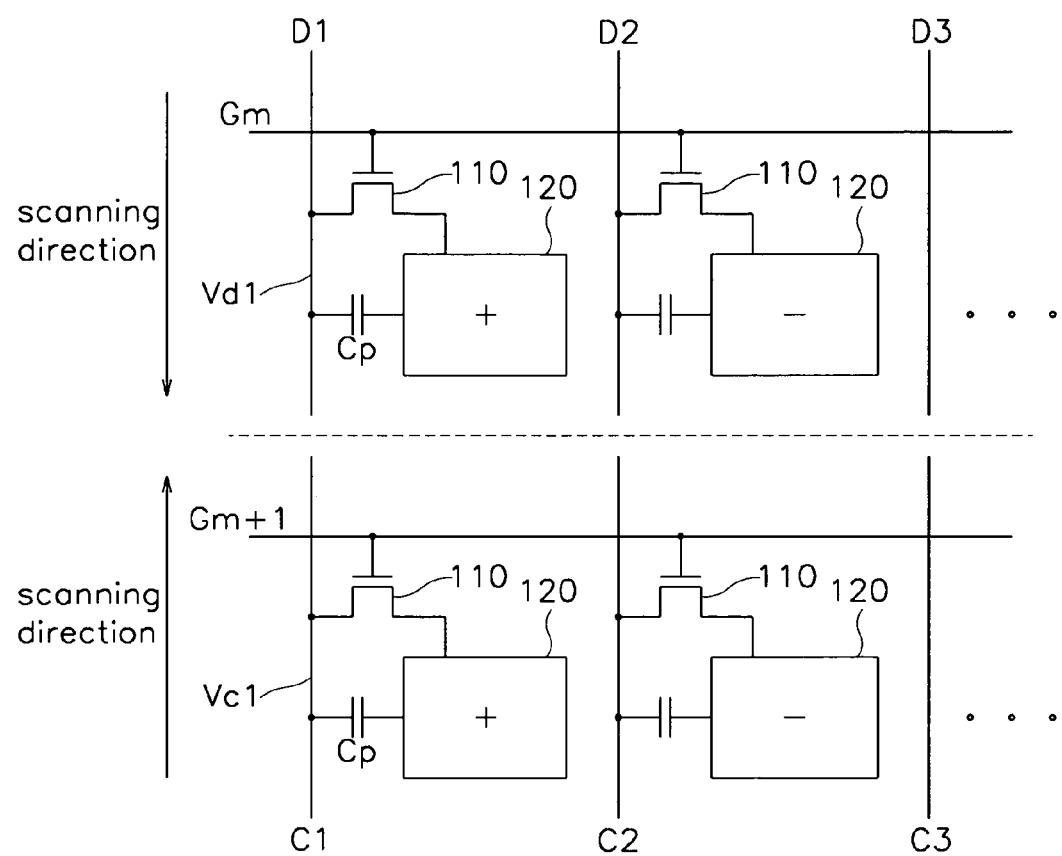

However, the driving method for the LCD according to the present invention also includes an embodiment where the gate line coupled to the upper gate driver is scanned from top to bottom, and the gate line coupled to the lower gate driver is scanned from bottom to top as shown in FIGS. 9 (a) and (b).

Referring to FIGS. 9 (a) and (b), LCD driving methods will be described according to third and fourth embodiments of the present invention.

The gate lines are scanned in the direction from the edges of the panels of the upper and lower LCDs to the boundaries where the two panels meet. That is, according to the third embodiment of the present invention as shown in FIG. 9 (a), the gate lines are scanned from the edges of the upper and lower LCD panels to the boundaries where the two panels meet, and pixel voltages with different polarities are supplied to the two pixels adjacent to the boundaries. According to the fourth embodiment of the present invention as shown in FIG. 9 (b), the gate lines are scanned from the edges of the upper LCD panel and the lower LCD panel to the boundaries where the two panels meet, and pixel voltages with identical polarities are supplied to the two pixels adjacent to the boundaries.

In order to drive the gate lines using the methods of the third and fourth embodiments of the present invention, the upper frame memory 410 in FIG. 3 transmits the image data to the upper data driver 210 in the same sequence as written, and the lower frame memory 420 transmits the image data to the lower data driver 220 in a reverse sequence of the order in which the image data are written. The upper gate driver 310 and the lower gate driver 320 respectively output gate-ON signals in sequence from the first gate line G1 of the upper gate line block and from the last gate line G2m of the lower gate line block. Other driving procedures in the methods of the third and fourth embodiments are identical to those described with reference to FIG. 3.

When driving the LCD according to the third and fourth embodiments of the present invention, the pixels of the two pixel rows at the boundaries are affected in the same direction by the voltage provided to the data lines. Therefore, since a difference in the amount of light permeating the liquid crystal material on the pixels of the boundaries is small, the brightness on the boundaries becomes almost uniform. Consequently, the conventional line patterns generated on the boundaries where the upper panel and the lower panel meet do not appear.

As noted above, according to the present invention, the non-uniform brightness phenomenon can be prevented by making the scanning direction of the gate lines of the upper panel opposite to that of the gate lines of the lower panel.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for driving a liquid crystal display (LCD) having a first gate line block and a second gate line block, the method comprising the steps of:

providing a first pixel voltage to a first pixel electrode formed in the first gate line block;

providing a second pixel voltage to a second pixel electrode formed in the second gate line block, the first pixel electrode and the second pixel electrode being arranged on the same column;

providing a common voltage to a common electrode;

providing a first data signal to a first data line formed in the first gate line block, said first data signal influencing a first voltage difference between the common voltage and the first pixel voltage stored in the first pixel electrode;

providing a second data signal to a second data line formed in the second gate line block, said second data signal influencing a second voltage difference between the common voltage and the second pixel voltage stored in the second pixel electrode; and controlling the first data signal and the second data signal based on polarities of the first pixel voltage stored in the first pixel electrode and the second pixel voltage stored in the second pixel electrode to simultaneously increase or decrease the first voltage difference and the second voltage difference.

2. The method of claim 1, wherein the first pixel voltage has a first polarity with respect to the common voltage and the second pixel voltage has a second polarity with respect to the common electrode different from the first polarity.

3. The method of claim 2, wherein the step of controlling the first data signal and the second data signal comprises the step of providing the first data signal of the first polarity and the second data signal of the second polarity to simultaneously increase the first voltage difference and the second voltage difference.

4. The method of claim 2, wherein the step of controlling the first data signal and the second data signal comprises the step of providing the first data signal of the second polarity and the second data signal of the first polarity to simultaneously decrease the first voltage difference and the second voltage difference.

5. The method of claim 1, wherein the first pixel voltage has a first polarity with respect to the common voltage and the second pixel voltage has the first polarity with respect to the common voltage.

6. The method of claim 5, wherein the step of controlling the first data signal and the second data signal comprises the step of providing the first data signal of the first polarity and the second data signal of the first polarity to simultaneously increase the first voltage difference and the second voltage difference.

7. The method of claim 5, wherein the step of controlling the first data signal and the second data signal comprises the step of providing the first data signal of a second polarity and the second data signal of the second polarity to decrease the first voltage difference and the voltage second difference.

8. The method of claim 1, wherein the first pixel electrode and the second electrode are adjoining each other.

9. The method of claim 1, wherein the LCD has more than two gate line blocks.

10. A liquid crystal display (LCD), comprising:
   a first gate line block including a first pixel electrode storing a first pixel voltage;
   a second gate line block including a second pixel electrode and storing a second pixel voltage, the first pixel electrode and the second pixel electrode being arranged on the same column;
   a common electrode transmitting a common voltage;
   a first data line formed in the first gate line block and transmitting a first data signal, said first data signal influencing a first voltage difference between the common voltage and the first pixel voltage stored in the first pixel electrode;
   a second data line formed in the second gate line block and transmitting a second data signal, said second data signal influencing a second voltage difference between the common voltage and the second pixel voltage; and
   a data driver controlling the first data signal and the second data signal based on polarities of the first pixel voltage stored in the first pixel electrode and the second pixel voltage stored in the second pixel electrode to simultaneously increase or decrease the first voltage difference and the second voltage difference.

11. The LCD of claim 10, wherein the first pixel voltage has a first polarity with respect to the common voltage and the second pixel voltage has a second voltage with respect to the common voltage different from the first polarity.

12. The LCD of claim 11, wherein the data driver provides the first data signal of the first polarity and the second data signal of the second polarity to simultaneously increase the first voltage difference and the second voltage difference.

13. The LCD of claim 11, wherein the data driver provides the first data signal of the second polarity and the second data signal of the first polarity to simultaneously decrease the first voltage difference and the second voltage difference.

14. The LCD of claim 10, wherein the first pixel voltage has a first polarity with respect to the common voltage and the second pixel voltage has the first polarity with respect to the common voltage.

15. The LCD of claim 14, wherein the data driver provides the first data signal of the first polarity and the second data voltage of the first polarity to simultaneously increase the first voltage difference and the second voltage difference.

16. The LCD of claim 14, wherein the data driver provides the first data signal of the second polarity and the second data voltage of the second polarity to simultaneously decrease the first voltage difference and the second voltage difference.

17. The LCD of claim 10, wherein the first pixel electrode and the second pixel electrode are adjoining each other.

18. The LCD of claim 10, wherein the data driver comprising:
   a first data driver connected to the first data line for transferring the first data line thereto; and
   a second data driver connected to the second data line for transferring the second data line thereto.

19. The LCD of claim 10, wherein the LCD has more than two gate line blocks.

20. A liquid crystal display (LCD), comprising:
   a first gate line block comprising:
      a plurality of first gate lines;
      a first pixel electrode storing a first pixel voltage; and
      a first data line transmitting a first data signal, the first data signal influencing a first voltage difference between the common voltage and the first pixel voltage stored in the first pixel electrode;
   a second gate line block comprising:
      a plurality of second gate lines;
      a second pixel electrode storing a second pixel voltage; and
      a second data line separated from the first data line and transmitting a second data signal, the second data signal influencing a second voltage difference between the common voltage and the second pixel voltage stored in the second pixel electrode;
   a data driver controlling the first data signal and the second data signal to simultaneously increase or decrease the first voltage difference and the second voltage difference; and
   a gate driver connected to the plurality of first gate lines and the plurality of second gate lines and scanning the plurality of first gate lines in a first direction and the plurality of second gate lines in a second direction different from the first direction.

* * * * *